, 1950

UNITED STATES PATENT OFFICE 2,525,927

2-NITRAMINO Δ²-1,3 DIAZACYCLOALKENES

Arthur Ferguson McKay, Kingston, Ontario, and George F. Wright, Toronto, Ontario, Canada, assignors to The Honorary Advisory Council for Scientific and Industrial Research, Ottawa, Ontario, Canada, a corporation of Canada No Drawing. Application September 26, 1947, Serial No. 776,418

12 Claims. (Cl. 260—239)

This invention relates to Δ²-1,3-diazacycloalkenes. Compounds of this type having as substituent in 2-position a nitrogen carrying two alkyl or aryl groups have previously been proposed as useful intermediates in the preparation of dyes, as auxiliary means in dyeing and as vulcanization accelerators. It has been found that compounds of this type in which the substituent in the 2-position is a nitramino group are very useful for a variety of purposes, for example, as intermediates in the synthesis of medicinal compounds of antihistamine activity useful in the treatment of allergy, and as intermediates for the purposes of flotation reagents of the cationic type. The main basis for the utility of the compounds in either case lies in having the highly reactive nitramino group in the 2-position, making it possible to react the compounds with a large selection of other compounds in each case without disturbing the structure of the diazacycloalkene ring, or the substituents thereof. The compounds according to the present invention are 2-nitramino-Δ²-1,3-diazacycloalkenes, in which at least one of the hydrogens in at least one of the methylene groups may be substituted by hydroxyl, halogen or an organic radical such as an alkyl, alkoxy, aryl, or aralkyl radical.

The compounds according to the present invention may be prepared by reacting directly the appropriate alkylene diamine with nitroguanidine, but are preferably prepared by reacting a diacid salt of the appropriate alkylene diamine with an alkali metal salt of nitroguanidine, since this method of production results in a substantially increased yield of the desired final product. When the monoacid salt of the appropriate alkylene diamine is used, a yield which is between the yields in the above two cases is obtained. The acid salts of the diamine may be, for example, hydrochloride, hydrobromide or hydrosulphuric salts, and the alkali metal salts of nitroguanidine may be, for example, potassium, sodium or caesium.

The preparation of an unsubstituted compound according to the invention where the salts of the reactants are respectively the hydrochloride and potassium salts is illustrated by the following:

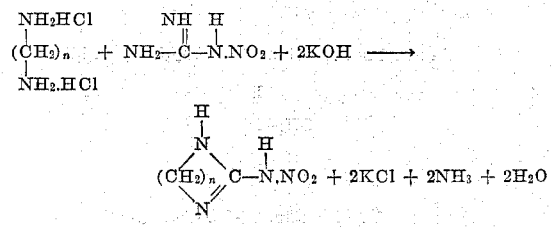

where $n$ is a whole number greater than 1 or less than 5.

The addition of the diamine dihydrochloride to the alkaline aqueous solution of nitroguanidine produces a heavy sludge. After this sludge has been heated for several minutes at about 70° C., the consistency changes sharply and the material becomes less viscous. This pronounced change may be used as a reference point. After the change, heating is continued for about twenty minutes. The reaction of the desired compound is then obtained by cooling the mixture to about 7° C., or less and filtering off the white precipitate. A small amount of potassium chloride which is co-precipitated may be easily removed by trituration with water and refiltration or by recrystallization of the product from water. The side products of the reaction, mainly ammonia and inorganic salts may be recovered by any well known method.

The preferred reaction temperature of 70° C., has not been found to be critical to the reaction, and the temperature may be varied at least from about 50° C. to about 90° C. without appreciably affecting the yields. However, in the preparation of certain compounds according to the invention it may be desirable to avoid the higher temperatures.

If the diamines and nitroguanidine are reacted directly without conversion to their acid and basic salts respectively, the yield of the compound according to the invention is found to be anywhere from 15 to 55% lower than when the preferred process of production is used.

In the preparation of Δ²-imidazoline derivatives the diamine diacid salts may be those of ethylene diamine or of substituted ethylene diamines of the following formulae:

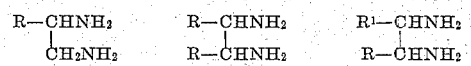

where R and R¹ are straight or branched chain alkyl groups.

In the case of compounds according to the present invention having higher membered ring structure, e. g. substituted or unsubstituted 2-nitramino-Δ²-tetrahydropyrimidine, or substituted or unsubstituted 2-nitramine-Δ²-1,3-diazacycloheptene, the diacid salt of the appropriate higher alkylene diamine will be chosen to react with a basic salt of nitroguanidine.

In the case of the formation of ring structures having from five to seven members, the appropriate alkaline diamines will also include those having aralkyl or aryl substitutions on nitrogen free carbon atoms. In fact as far as is known all alkylene diamines containing two or less carbon atoms between the amino bearing carbon atoms are suitable for purposes of the reaction with the exception of those whose steric structure interferes with the formation of a diazacycloalkene ring. Aralkyl or aryl substituted diamines are generally subject to steric interference when the substituent is attached to an amino bearing carbon and accordingly such diamines are not generally suitable for the processes of the invention. It is generally a fairly simple matter for one skilled in the art to determine whether or not a given substituted diamine will or will not be subject to steric interference.

The following are examples of compounds according to the present invention. It will be noted that in some there is no substitution in any methylene group and in others some or all of the methylene groups are substituted.

1.
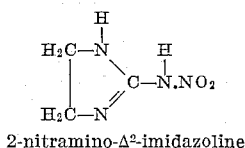
2-nitramino-$\Delta^2$-imidazoline

2.
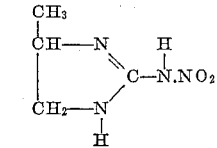
4(5)-methyl-2-nitramino-$\Delta^2$-imidazoline

3.
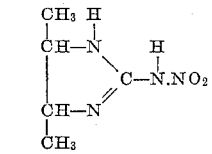
4,5-dimethyl-2-nitramino-$\Delta^2$-imidazoline

4.
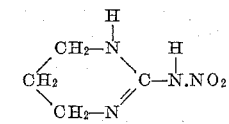
2-nitramino-$\Delta^2$-tetrahydropyrimidine

5.
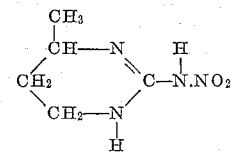
4(6)-methyl-2-nitramino-$\Delta^2$-tetrahydropyrimidine

6.
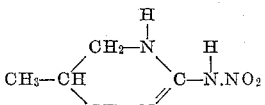
5-methyl-2-nitramino-$\Delta^2$-tetrahydropyrimidine

7.
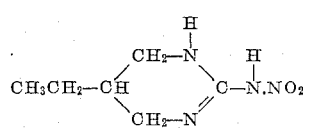
5-ethyl-2-nitramino-$\Delta^2$-tetrahydropyrimidine

8.
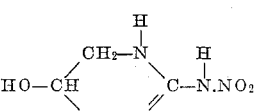
5-hydroxy-2-nitramino-$\Delta^2$-tetrahydropyrimidine

9.
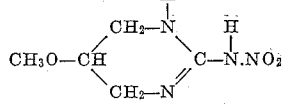
5-methoxy-2-nitramino-$\Delta^2$-tetrahydropyrimidine

10.
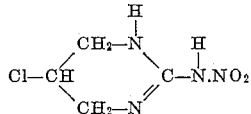
5-chloro-2-nitramino-$\Delta^2$-tetrahydropyrimidine

11.
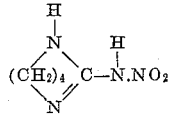
2-nitramino-$\Delta^2$-1,3-diazacycloheptene

12.
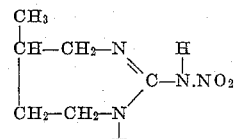
5(6)-methyl-2-nitramino-$\Delta^2$-1,3-diazacycloheptene

13.
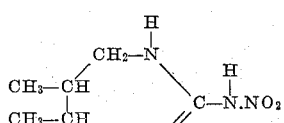
5,6-dimethyl-2-nitramino-$\Delta^2$-1,3-diazacycloheptene

14.
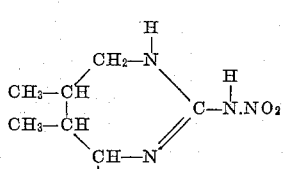
4,5,6-trimethyl-2-nitramino-$\Delta^2$-1,3-diazacycloheptene

15.
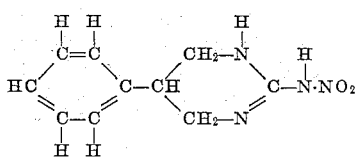
5-phenyl-2-nitramino-$\Delta^2$-tetrahydropyrimidine

16.
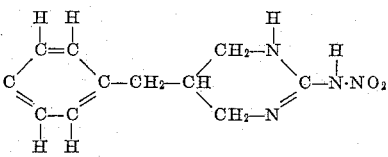
5-benzyl-2-nitramino-$\Delta^2$-tetrahydropyrimidine

17.
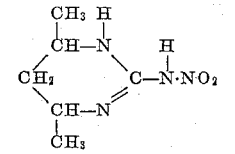
4,6-dimethyl-2-nitramino-$\Delta^2$-tetrahydropyrimidine

18.
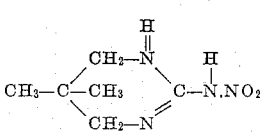
5,5-dimethyl-2-nitramino-$\Delta^2$-1,3-diazacyclohexene

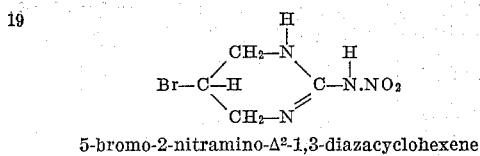

5-bromo-2-nitramino-Δ²-1,3-diazacyclohexene

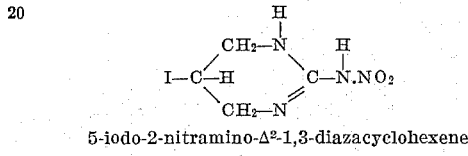

5-iodo-2-nitramino-Δ²-1,3-diazacyclohexene

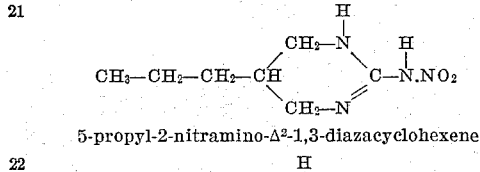

5-propyl-2-nitramino-Δ²-1,3-diazacyclohexene

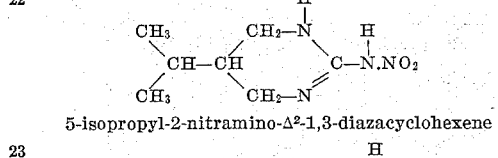

5-isopropyl-2-nitramino-Δ²-1,3-diazacyclohexene

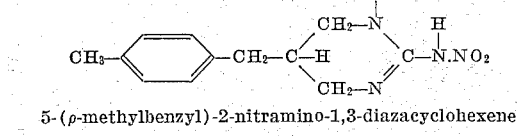

5-(p-methylbenzyl)-2-nitramino-1,3-diazacyclohexene

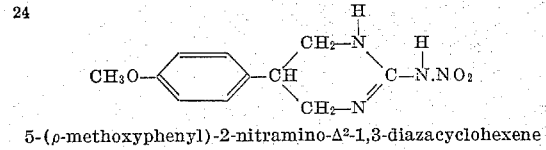

5-(p-methoxyphenyl)-2-nitramino-Δ²-1,3-diazacyclohexene

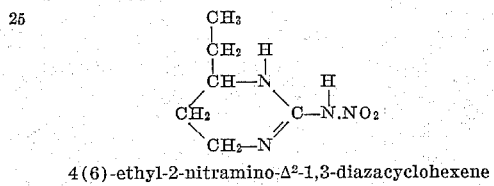

4(6)-ethyl-2-nitramino-Δ²-1,3-diazacyclohexene

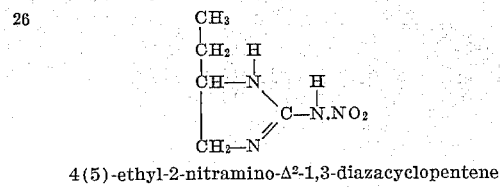

4(5)-ethyl-2-nitramino-Δ²-1,3-diazacyclopentene

The compounds according to the present invention and their preparation are further illustrated by the following examples:

EXAMPLE I

*Preparation of 2-nitramino-Δ²-Imidazoline*

52 parts of nitroguanidine were dissolved in 100 parts of water containing 56 parts of potassium hydroxide at about room temperature. To this slowly stirred solution were added 78 parts of ethylenediamine dihydrochloride. A heavy sludge was formed which was brought to a temperature of 65° C. in eight minutes. At this point there was a marked change in the consistency and structure of the nitrogenous mass. The change in physical properties of the reaction mixture was used as a reference point in all runs. After this change was noted the temperature of the mixture was maintained at 69–71° C. for fifteen minutes. Then it was cooled to 7° C. and the precipitate recovered by filtration. The precipitate was triturated with water (2 cc. per gram of solid) and the aqueous suspension was heated to a slow reflux, after which it was immediately cooled to 2° C. The precipitate was filtered off, washed with water and dried. The final product (M. P. 217.9–220°) was free from potassium chloride. The yield was 65.4 percent of theory.

EXAMPLE II

*Preparation of 4(5)-methyl-2-nitraminoΔ²-imidazoline*

104 parts of nitroguanidine were dissolved in 200 parts of water containing 112 parts of potassium hydroxide. To this solution were added 82.1 parts of 1,2-propylenediamine (85%) which had been neutralized with concentrated HCl. The resultant sludge was heated 65° C. when the transition in physical properties occurred. The temperature was then held at 70° for twenty minutes when the reaction mixture was cooled to 0° C. The white precipitate was filtered off and freed from KCl by washing with water. The final yield of product (M. P. 168–169° C.) was 64 percent by theory. This product was purified by crystallizing from 95 percent ethanol (21 cc. per gram). The final melting point was 170.5° C.; yield 63.6 parts by weight.

EXAMPLE III

*Preparation of 2-nitramino-Δ²-tetrahydropyrimidine*

Dissolved 26 parts by weight of nitroguanidine in 100 parts of water containing 28 parts of potassium hydroxide. Then 38.25 parts by weight (1.04 mole equivalents) of aqueous 1,3-diaminopropanedihydrochloride were added with stirring. The resultant sludge was heated to 68° C. in six minutes and maintained at 60–68° C. for a further seven minutes. During the reaction there was a strong evolution of ammonia. After the heating period, the reaction mixture was cooled to 7° C. and the white solid was recovered by filtration: 19.8 parts (55 percent yield by theory) of white solid were obtained melting at 251–252° C. with decomposition. Crystallization from 96 percent ethanol (ca. 72 c. c. per gram of solid) did not raise the melting point.

EXAMPLE IV

*Preparation of 4(6)-methyl-2-nitramino-Δ²-tetrahydropyrimidine*

10.4 parts by weight of nitroguanidine were dissolved in 25 parts of water containing 11.3 parts of potassium hydroxide. To this clear solution, 32.1 parts (1.2 mole equivalents) of a solution of 1,3-diaminobutanedihydrochloride were added with stirring. The resultant sludge was heated to 68° in four minutes and maintained at a temperature of 69–73° C. for a period of twenty-three minutes. The reaction mixture was then cooled to −1° C. and the white solid (5.7 parts: 36 percent by theory) was recovered by filtration and washed with water (60 parts). The crude product melting at 144–146° C. was purified by crystallization from 95 percent ethanol (ca. 5 cc. per gram of solid) to give a final melting point of 147.5–148.5° C.

EXAMPLE V

*Preparation of 2-nitramino-Δ²-1,3-diazacycloheptene*

To a solution of 4.5 parts of potassium hydroxide in 50 parts of water, 4 parts by weight of nitroguanidine were added. Then 6.5 parts of solid 1,4-diaminobutanedihydrochloride were added with stirring. A sludge formed and this reaction mixture was heated to 65° C. in one minute and the temperature was maintained at 71–79° C. for twenty-five minutes. After a few minutes the sludge disappeared and a different type (more granular) of solid separated. At the end of the heating period, the reaction mixture was cooled to ca. 10° C. and filtered. The white solid (M. P. 204–205 with decomposition) was washed with water (30 parts) and dried at 60° C. overnight. The yield (3.9 parts) was 64.3 percent by theory. On crystallization from ethanol (600 cc. per 600 mg.) raised the melting point to 219.5–220° C. with decomposition.

EXAMPLE VI

*Preparation of 5-hydroxy-2-nitramino-$\Delta^2$-1,3-diazacyclohexene*

One hundred and four parts by weight of nitroguanidine were dissolved in 176 parts of water containing 112 parts of potassium hydroxide. To this solution, 294 parts of an aqueous solution containing 1 mole equivalent of 1,3-diaminopropanol-2-dihydrochloride were added with stirring. The resulting sludge was maintained at a temperature of 68±2° C. for a period of twenty-five minutes with occasional stirring. After nine minutes of heating, the reaction mixture became homogeneous. At the end of the reaction period, the solution was cooled to 1° C. and the white crystals were filtered off and washed well with water. Ninety-three parts by weight (58% yield) of 5-hydroxy-2-nitroamino-$\Delta^2$-1,3-diazacyclohexene were obtained contaminated with a trace of potassium chloride. The melting point was 233–235° C. with decomposition.

By using the appropriate method and technique as outlined in the above examples any of the compounds given by way of examples are capable of preparation.

What we claim as our invention is:

1. As new compounds, 2-nitramino-$\Delta^2$-1,3-diazacycloalkenes of the formula

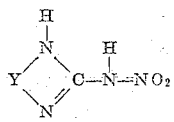

where Y is lower alkene.

2. As a new compound 2-nitramino-$\Delta^2$-1,3-diazacyclopentene having the structural formula

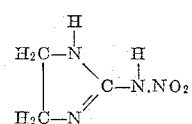

3. As a new compound 2-nitramino-$\Delta^2$-1,3-diazacyclohexene having the structural formula

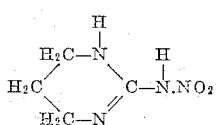

4. As a new compound 2-nitramino-$\Delta^2$-1,3-diazacycloheptene having the structural formula

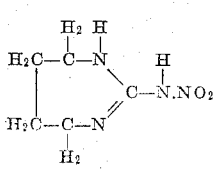

5. As a new compound 4(5)-methyl-2-nitramino-$\Delta^2$-1,3-diazacyclopentene having the structural formula

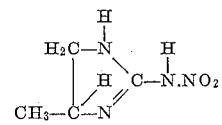

6. As a new compound 4(6)-methyl-2-nitramino-$\Delta^2$-1,3-diazacyclohexene having the structural formula

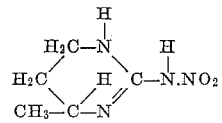

7. The process for preparing 2-nitramino-$\Delta^2$-1,3-diazacycloalkenes of the formula

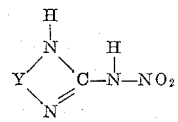

where Y is lower alkene, which comprises reacting a compound selected from the group consisting of ethylene diamine, 1,3-diaminopropane, 1,4-diaminobutane, 1,2-propylenediamine, 1,3-diaminobutane, 1,3-diaminopropanol and the acid salts thereof, with a compound selected from the group consisting of nitroguanidine and alkali metal salts thereof at a temperature of from about 50 degrees C. to about 90 degrees C.

8. The process of producing 2-nitramino-$\Delta^2$-1,3-diazacyclopentene which comprises reacting ethylenediamine dihydrochloride with an aqueous potassium hydroxide solution of nitroguanidine at a temperature of from 65° C. to 71° C.

9. The process of producing 2-nitramino-$\Delta^2$-1,3-diazacyclohexene which comprises reacting 1,3-diaminopropane-dihydrochloride with an aqueous potassium hydroxide solution of nitroguanidine.

10. The process of producing 2-nitramino-$\Delta^2$-1,3-diazacycloheptene which comprises reacting 1,3-diaminobutane-dihydrochloride with an aqueous potassium hydroxide solution of nitroguanidine at a temperature of from 65° to 79° C.

11. The process of producing 4(5)-methyl-2-nitramino-$\Delta^2$-1,3-diazacyclopentene which comprises reacting 1,2-propylene-diaminedihydrochloride with an aqueous potassium hydroxide solution of nitroguanidine at a temperature of from 65° to 70° C.

12. The process of producing 4(6)-methyl-2-nitramino-$\Delta^2$-1,3-diazacyclohexene which comprises reacting 1,3-diaminobutanedihydrochloride with an aqueous potassium hydroxide solution of nitroguanidine at a temperature of from 68° to 73° C.

ARTHUR FERGUSON McKAY.
GEORGE F. WRIGHT.

No references cited.